United States Patent Office 3,355,361
Patented Nov. 28, 1967

3,355,361
RECOVERY AND PURIFICATION OF
UROKINASE
Alex Lesuk, Bethlehem, N.Y., assignor to Sterling Drug
Inc., New York, N.Y., a corporation of Delaware
No Drawing. Filed Oct. 15, 1964, Ser. No. 404,156
21 Claims. (Cl. 195—62)

ABSTRACT OF THE DISCLOSURE

Urokinase is precipitated from mammalian urine, eluted from the precipitate with dilute aqueous 6,9-diamino-2-ethoxyacridine solution, then is adsorbed onto calcium phosphate gel and eluted therefrom with sodium phosphate buffer, and is further purified and concentrated by use of carboxymethylcellulose. This process is used in the production of human urokinase in substantially homogeneous form, having a molecular weight of approximately 54,000 and a specific urokinase activity of approximately 104,000 CTA units per mg. of estimated protein, and being substantially free of pyrogens and thromboplastic substances. This product is for injection in aqueous solution to dissolve blood clots in humans.

---

This invention relates to the recovery of urokinase from mammalian urine and to the purification of the urokinase thus obtained.

Urokinase, an enzyme present in the urine of mammals, catalyzes the conversion of plasminogen (profibrinolysin) to plasmin (fibrinolysin), an enzyme which is capable of lysing fibrin clots. Urokinase-containing preparations have been shown to have value as a therapeutic agent, particularly in fibrinolytic treatment of thromboembolic diseases in human subjects.

Prior to the instant invention, urokinase-containing preparations have been obtained from mammalian urine by a variety of procedures which in general comprise the steps of: treating mammalian urine with a reagent causing formation of a urokinase-containing precipitate; collecting the urokinase-containing precipitate; and eluting the precipitate to produce a urokinase-containing solution. In some instances the eluate obtained in this manner has been used as such for its fibrinolytic activity, whereas in other instances the eluate has been subjected to further processing for the purpose of improving the purity of the urokinase. Such prior efforts have not succeeded in producing a crystalline preparation of urokinase.

Several reagents are known which when brought into contact with mammalian urine cause separation of an easily collected precipitate which contains substantially all or a major proportion of the urinary proteins, including urokinase, as well as other proteinaceous material. On the other hand, the processing of the resulting urokinase-containing precipitate to separate the urokinase in good yield and high quality from the precipitating agent and from the contaminating proteins, pyrogens, inhibitors, thromboplastic substances and the like presents many difficult problems. As a result, although more or less concentrated preparations of urokinase have been afforded by the prior art methods, all of these procedures suffer from serious drawbacks and none of them has provided a crystalline preparation of urokinase.

It is an object of this invention to provide novel improvements in certain steps of the above-indicated general procedures for recovery and purification of urokinase from mammalian urine, to provide a novel method for obtaining urokinase which incorporates these improved steps so that urokinase is obtained in good yield and in a high state of purity, and to provide urokinase in crystalline form.

I.—Elution of urokinase from urine-derived urokinase-containing precipitates In one aspect, the instant invention resides in the concept of an improvement in the elution step of the above-indicated general procedure for obtaining urokinase wherein mammalian urine is treated with a reagent causing formation of a urokinase-containing precipitate, the resulting precipitate is collected, and the urokinase is then eluted from the precipitate, said improvement comprising eluting the urokinase from the urokinase-containing precipitate with a dilute aqueous solution of 6,9-diamino-2-ethoxyacridine. The concentration of 6,9-diamino-2-ethoxyacridine in the eluting solution is 0.1 to 2 percent or more by weight, and is preferably about 0.4 percent by weight. The pH of the solution is adjusted to a value in the approximate range 1.5–7; preferably the solution is acidic, in the pH range 2–5. When it is desired to do so, the 6,9-diamino-2-ethoxyacridine is readily removed from the eluate by salting out with sodium chloride or an equivalent water-soluble inorganic salt. Alternatively, and advantageously, the removal of the 6,8-diamino-2-ethoxyacridine is accomplished as a part of the method described hereinbelow, in Part II, for removal of pyrogens from urokinase solutions.

The production of the urokinase-containing precipitate in the above-described method is readily carried out, for instance by employing any of the many well-known methods for precipitating urokinase from mammalian urine. In those instances when the elution step does not follow the precipitation step promptly, for example when a number of lots of precipitate are collected over a period of days and then pooled, to assure a satisfactory yield of urokinase the wet urokinase-containing precipitate should be frozen immediately after it is collected, and then is stored in frozen state. The frozen precipitates are thawed when needed for use in the elution step.

I particularly prefer to obtain the urokinase-containing precipitate by contacting mammalian urine with bentonite or equivalent aluminum silicate composition and thereafter collecting, for instance by centrifugation, the bentonite with urokinase adsorbed thereon. Ordinarily, I prefer to use about 0.1–0.5 grams of bentonite per liter of urine to ensure rapid and efficient adsorption of urokinase. Although it was known prior to the instant invention that bentonite adsorbs virtually all of the urokinase from urine, previously no practical method for recovering the adsorbed urokinase from the bentonite has been described. I have now found that an aqueous solution of 6,9-diamino-2-ethoxyacridine, preferably at a pH in the approximate range 1.5–7, is a highly efficient eluting agent for recovering urokinase from bentonite on which the urokinase is adsorbed.

Another convenient and simple method for obtaining a urokinase-containing precipitate from mammalian urine for use in accordance with the above-described method comprises adjusting the pH of the urine to a value in the approximate range 4 to 5.5, for instance by addition of acetic acid or other suitable acid, cooling the thus-acidified urine, and collecting the urokinase-containing precipitate which forms.

I have discovered a further method by which urokinase can be eluted in good yield from the urokinase-containing precipitate produced by acidifying urine. My new method comprises washing the urokinase-containing precipitate thoroughly with acidulated water at a pH in the approximate range 3.2 to 5.5, and then eluting the urokinase from the thus-washed precipitate with acidulated water at a pH in the approximate range 1.5 to 3, a pH of 2 being preferred.

II.—Removal of pyrogens from urokinase solutions

In another aspect, the instant invention resides in the concept of a novel method for the removal of pyrogens from aqueous urokinase solutions.

It is known to remove pyrogens from aqueous solutions of biologically active materials, including various types of enzymes intended for injection, by adding thereto a water-insoluble alkaline earth phosphate such as calcium phosphate to adsorb the pyrogens, but not the desired biologically active material, the phosphate with pyrogens adsorbed thereon being then removed and discarded. However, this known method does not effect separation of pyrogens from urokinase because urokinase is also adsorbed by the water-insoluble phosphate and, moreover, conventional eluting agents remove both the adsorbed pyrogens and the adsorbed urokinase from the insoluble phosphate.

I have now discovered that when a pyrogen-containing aqueous solution of urokinase is contacted with calcium phosphate gel, or equivalent amorphous water-insoluble alkaline earth phosphate, having 6,9-diamino-2-ethoxyacridine adsorbed thereon, the urokinase and a major proportion of the pyrogens is adsorbed onto the gel, and by elution with a buffer of sodium phosphate or equivalent water-soluble phosphate the adsorbed urokinase and only a minor proportion of the adsorbed 6,9-diamino-2-ethoxyacridine are removed while leaving almost all of the pyrogens on the gel. The elution step is rendered much more efficient when the gel is frozen and thereafter thawed. The relatively small amount of the 6,9-diamino-2-ethoxyacridine which is present in the resulting eluate can be salted out of the urokinase-containing eluate by treatment with sodium chloride, or equivalent water-soluble inorganic salt, or is removed by adsorption into carboxymethylcellulose. Alternatively, the urokinase is precipitated and recovered from the eluate by addition of a lower alkanol, leaving the 6,9-diamino-2-ethoxyacridine in solution.

In a preferred embodiment, my new method of pyrogen removal comprises: contacting a pyrogen-containing aqueous urokinase solution at a pH in the approximate range 6.0–7.0 with calcium phosphate gel having 6,9-diamino-2-ethoxyacridine adsorbed thereon, whereby the urokinase and a major proportion of the pyrogens are adsorbed onto the calcium phosphate gel; collecting the calcium phosphate gel with urokinase, pyrogens, and 6,9-diamino-2-ethoxyacridine adsorbed thereon, washing the gel with water, the wash liquid being discarded; suspending the gel in a sodium phosphate buffer at a pH in the approximate range 6.0–7.0 wherein the molar concentration of sodium phosphate is at least 0.25, and preferably is in the approximate range 0.25–0.50, a molar concentration of 0.36 being particularly preferred; freezing the resulting mixture and thereafter thawing it, whereby the urokinase and a small proportion of the 6,9-diamino-2-ethoxyacridine are eluted from the gel into the phosphate buffer and the major portion of the pyrogens remains adsorbed on the gel; and separating the remainder of the 6,9-diamino-2-ethoxyacridine from the urokinase.

The foregoing procedure is especially advantageous when used to remove pyrogens from the 6,9-diamino-2-ethoxyacridine-containing aqueous urokinase solutions described above in section I as an eluting agent, because in such case the 6,9-diamino-2-ethoxyacridine needed for adsorption onto the calcium phosphate is already present, and thus no pretreatment of the calcium phosphate is required; and at the same time of course the pyrogen-removing procedure also serves to separate the major proportion of the 6,9-diamino-2-ethoxyacridine eluting agent from the urokinase.

III.—Adsorption of urokinase onto carboxymethylcellulose and elution therefrom In still another aspect, the instant invention resides in the concept of a novel method for purification and concentration of urokinase in aqueous solutions containing at least 500 CTA units of urokinase per ml. of solution, that is solutions wherein the urokinase concentration is about one hundred times or more the 4–6 CTA units per ml. concentration of urokinase ordinarily present in urine. My new method comprises: contacting an aqueous solution containing at least 500 CTA units of urokinase per ml. at a pH in the approximate range 5.0 to 6.5 with carboxymethylcellulose, which adsorbs the urokinase; and then eluting the urokinase from the carboxymethylcellulose. The elution is readily effected using high ionic strength aqueous solutions, for instance, a sodium phosphate buffer solution; or, alternatively, highly acidic media of pH down to 1.5 or highly basic media of pH up to 11.5 can be used in place of the salt or buffer solution. This new method can be carried out either in a batchwise procedure, in which the aqueous solution and the carboxymethylcellulose are mixed together and equilibria between the solid and liquid phases are established, or in a continuous washing procedure, as in elution through a column. In a bath procedure, the carboxymethylcellulose with urokinase adsorbed thereon is collected and the urokinase is eluted from the carboxymethylcellulose, preferably with sodium phosphate buffer at a pH in approximate range 6.0–7.0 wherein the molar concentration of sodium phosphate is at least 0.25, and preferably is in the approximate range 0.25–0.50, a molar concentration of 0.29 being particularly preferred. In a continuous procedure, the pH of the sodium phosphate buffer is preferably in the approximate range 1–11 and the molar concentration of sodium phosphate is in the approximate range 0.005–0.5, a concentration of approximately 0.05 being preferred at pH 2–5 and 7–11 and a concentration of at least 0.05 and desirably about 0.2 being preferred at pH 5–7.

Most of the pyrogens are separated from the urokinase by this carboxymethylcellulose treatment. Moreover, a substantial concentration of the urokinase is effected. Thus, when used to purify urokinase having a relatively low average specific urokinase activity, for instance in the approximate range of 1000 to 20,000 CTA units per mg. of protein, the urokinase in the resulting eluate has a substantially increased activity, ordinarily five to ten fold or more.

The urokinase-containing eluate provided by the procedure described above in Section II is especially suitable for use as a starting material in this carboxymethylcellulose procedure. In such case the molar concentration of the sodium phosphate in the eluate should be reduced by dilution to a value no greater than 0.15 to assure maximum adsorption of urokinase onto the carboxymethylcellulose.

By application of both the adsorption onto carboxymethylcellulose and the adsorption onto 6,9-diamino-2-ethoxyacridine - treated calcium phosphate procedures, urokinase is obtained which is substantially pyrogen-free.

IV.—Obtaining urokinase in highly concentrated form from mammalian urine

In another aspect, the instant invention resides in the concept of a novel method for obtaining urokinase in highly concentrated form from mammalian urine which combines the several other aspects of my invention as described above. This new method comprises the steps of:

Treating mammalian urine with a reagent causing formation of a urokinase-containing precipitate.

Eluting urokinase from the urokinase-containing precipitate with a dilute aqueous solution of 6,9-diamino-2-ethoxyacridine; contacting the resulting eluate, preferably at a pH in the approximate range 6.0–7.0, with calcium phosphate gel whereby the urokinase, pyrogens, and a minor proportion of the 6,9-diamino-2-ethoxyacridine are adsorbed onto the gel, and then collecting the gel, suspending it in a sodium phosphate buffer (preferably at a pH in the approximate range 6.0–7.0 wherein the molar concentration of the sodium phosphate is in the approximate range 0.25 to 0.50) and freezing the mixture and thereafter thawing it, whereby the urokinase and a minor proportion of the 6,9-diamino-2-ethoxyacridine are eluted from the gel into the phosphate buffer and the bulk of the pyrogens remains adsorbed on the gel; contacting the urokinase-containing eluate with carboxymethylcellulose, which adsorbs the remainder of the 6,9 - diamino - 2-ethoxyacridine; separating the carboxymethylcellulose with 6,9-diamino-2-ethoxyacridine adsorbed thereon from the urokinase-containing solution; adjusting the molar concentration of sodium phosphate in the urokinase-containing solution to a value no greater than approximately 0.15 and contacting the resulting solution at a pH in the approximate range 5.0 to 6.5 with carboxymethylcellulose, which adsorbs the urokinase; and eluting the urokinase from the carboxymethylcellulose, preferably with a sodium phosphate buffer at a pH in the approximate range 6.0 to 7.0 wherein the molar concentration of sodium phosphate is at least 0.25.

V.—*Preparation of crystalline human urokinase*

In a further aspect, the instant invention resides in the concept of human urokinase in crystalline, substantially homogeneous form and of means for providing the same.

Since the discovery of urokinase more than a decade ago a number of procedures for the partial purification of the enzyme have been described. However, many of the more fundamental chemical and biological studies of urokinase have been hindered by the lack of substantially homogeneous preparations. I have now succeeded in obtaining human urokinase in crystalline, substantially homogeneous form by starting with aqueous solutions of the highly purified human urokinase preparations having an activity equal to, or greater than 40,000 CTA units per mg. of protein. The required starting preparations for this procedure have been made available by application of the several further aspects of this invention as described herein. In accordance with my invention, human urokinase in crystalline form is obtained by: dissolving a urokinase preparation having urokinase activity of at least 40,000 CTA units per mg. of protein with sodium phosphate buffer at a pH in the approximate range 6 to 7 to produce a solution having a urokinase activity of at least 100,000 CTA units per ml.; dialyzing the resulting solution at 0–4° C. against water until the specific resistance increases to at least 2500 ohms, removing and discarding the precipitate which forms, salting the urokinase out of solution by treatment with sodium chloride, collecting the thus-precipitated urokinase and dissolving it in aqueous sodium chloride solution; and salting the urokinase out of solution with sodium chloride, whereby the urokinase is obtained in crystalline form. By further recrystallization of this product as described in Example 3 hereinbelow, urokinase is obtained in crystalline, substantially homogeneous form. The product thus obtained has a molecular weight of approximately 53,300 and a specific activity of 652,000±29,800 (s.d.) CTA units per mg. of nitrogen (Kjeldahl), or 104,000±4800 (s.d.) CTA units per mg. of estimated protein.

My invention is illustrated by the following examples without, however, being limited thereto. The narrow ranges of pH, temperature, concentrations, and the like are specified in these examples merely for the purpose of reasonably good reproducibility of results in a series of runs and are not indicative of criticality of conditions necessary to satisfactory operability in any given instance.

EXAMPLE 1

(A) *Urine collection*

Human male urine is collected directly over boric acid powder (U.S.P.) in clean 5-gallon polyethylene carboys fitted with clean 10-inch polyethylene funnels. The amount of boric acid present in each carboy should be such that when the anticipated volume of urine has been collected, the final boric acid concentration approximates 0.25% (w./v.); thus, for example, if it is estimated that the carboy contents will average 3 gallons of urine at pick-up time, 30 g. of boric acid should be introduced into each carboy before use. The funnels contain commonly used deodorant blocks of p-dichlorobenzene. Advantageously, collection periods should not exceed twelve hours, since for best results bacterial growth and formation of pyrogens in the urine should be minimized. Thus, filled carboys are gathered immediately after the relatively voluminous morning contributions have been made. Such scheduling permits processing of the urine with minimum delay. Whenever urine is collected over the subsequent twelve hour period, it is stored under refrigeration until it is processed the following morning.

(B) *Adsorption of urokinase from urine*

To 160 liters of pooled human urine at 15°–25° C. add 24 g. of bentonite powder (U.S.P.) with stirring. In order to assure uniform dispersion of the bentonite, it is preferably added as a freshly prepared 3% suspension in urine. After the mixture has been stirred for twenty minutes or more, the precipitate which forms is isolated by centrifugation, e.g. in an ice-water-cooled centrifuge with a one-quarter inch nozzle and having a throughput rate of 125 gal./hr. The precipitate is removed from the centrifuge bowl without delay and is frozen immediately in a polyethylene sack or bottle; the average weight of the moist precipitate thus obtained from each liter of urine is 0.8 g. (in a representative series of runs this ranged from 0.65 to 1.4 g.). The urinary supernatant is discarded after sampling, while the precipitate, which contains over 98 percent of the urokinase originally present in the urine, is stored frozen until a sufficient number of lots has been obtained to proceed with further purification steps.

(C) *Elution of adsorbed urokinase from bentonite*

The bentonite precipitates obtained as described in Section B are pooled for further processing in any desired amount, based on equipment capacity, schedules, or other relevant considerations. Ten lots are pooled in the present example for purposes of illustration.

When it is desired to obtain a urokinase composition which is injectable, throughout the remainder of this preparative procedure all water, reagents, and vessels should be pyrogen-free.

The frozen bentonite precipitates (approximately 1.25 kg.) obtained by treating a total of 1600 liters of urine are pooled and permitted to thaw partially at room temperature; the pooled precipitates are homogenized with small amounts of cool (less than 10° C.) water. The homogenate is diluted to 32 liters with additional water at 10° C. and the pH is carefully adjusted to 4.00±0.05 by the slow addition of N/1 HCl with good stirring. The precipitate is isolated by centrifugation in the cold at 1500 g.; the supernatant wash is discarded. This wash procedure is repeated, but the homogenization step is generally unnecessary during this second wash. The twice-washed bentonite precipitate is suspended in 25.6 liters of water, preferably at approximately 37° C., and 6.4 liters of 2.0 percent (w./v.) aqueous solution of 6,9-diamino-2-ethoxyacridine lactate monohydrate at 37° C. or less, preadjusted to pH 4.0, are added. The temperature of the mixture is then raised to 37° C.±1° C. and the pH adjusted to 4.00 with constant stirring. The mixture is then centrifuged at 1500 g. for twenty minutes and the precipitate is discarded; the supernatant fluid, which contains more than 90 percent of the activity present in the original urine, is chilled quickly to 0°–4° C. and the pH is then adjusted to 6.50±0.05 by the careful addition of N/1 HCl with stirring. An aliquot sample is withdrawn for immediate assay.

*Proceed to the next step, (D), with minimum delay.*

(D) *Adsorption of urokinase upon a calcium phosphate gel*

A calcium phosphate gel suspension is prepared as follows:

A solution of 53.5 g. of calcium chloride in 3.5 liters of distilled water is added to a solution of 122.5 g. of $Na_3PO_4.12H_2O$ in 3.5 liters of distilled water. The mixture is stirred for thirty minutes in the cold and the gel is collected by centrifugation at 1500 g. at 0° C. for ten minutes; the gel volume is approximately 1.5 liters. The gel is re-suspended in 4 liters of 0.0725 M $NaT_2PO_4$ and stirred for thirty minutes and again collected by centrifugation. The gel is then washed twice with 4 liter portions of water; the final volume of centrifuged gel is approximately 800 ml. (equivalent to 50 g. $Ca_3(PO_4)_2$, dry weight basis). The gel is suspended in an amount of distilled water to yield a total volume of 2000 ml., containing 25 mg. (dry weight basis) of $Ca_3(PO_4)_2$/ml.

The aqueous solution of 6,9-diamino-2-ethoxyacridine lactate monohydrate and urokinase at pH 6.50 obtained in Part C above is treated with an amount of calcium phosphate gel suspension obtained as described above such that 1 mg. (dry weight basis) of $Ca_3(PO_4)_2$ is present for every 200 CTA units of urokinase. The average amount of $Ca_3(PO_4)_2$ required is 33 mg. (dry weight) per liter of urine processed to this stage. If specific assay data are not available, the equivalent of 50 mg. (dry weight) of $Ca_3(PO_4)_2$ is added per liter of urine processed to this stage in order to insure adequate adsorption of urokinase. The $Ca_3(PO_4)_2$ gel suspension is added rapidly to the urokinase solution with efficient stirring at 4° C. or less. Stirring speed is then immediately reduced and maintained thus for thirty minutes, after which the gel fraction is isolated by centrifugation. Before the supernatant fluid may be discarded, it should be confirmed by assay that less than 5 percent of the original urokinase activity remains therein. The gel, which contains adsorbed urokinase and 6,9-diamino-2-ethoxyacridine lactate, is washed by gentle dispersion in 10 volumes of water at 4° C. or less. The gel is then re-isolated by centrifugation and is weighed; the wash fluid is discarded. An amount of 0.725 M sodium phosphate buffer at pH 6.50±0.02 equal in weight to that of the fluid entrapped in the moist gel is added to the gel and the mixture is stirred gently to obtain uniform dispersion of the gel. An aliquot sample is withdrawn for assay of potency and pyrogenicity and for preliminary study of thermostability. Centrifuge the aliquot portion of gel suspension; preferably, freeze and thaw the suspension before centrifugation. Using the supernatant fraction, intravenous doses of 200 CTA units/kg. should not be more than mildly pyrogenic at this stage, i.e., temperature rises in test rabbits should not exceed 0.6–0.8° C. If this specification is not met, a treatment of the eluate with $Ca_3(PO_4)_2$ gel pretreated with 6,9-diamino-2-ethoxyacridine lactate monohydrate can be used to remove pyrogens. Additionally, as a precaution, a preliminary trial of Steps E and F can be made on an aliquot sample if this preliminary trial indicates losses in excess of 30 percent due to the heating in Step F, some deleterious impurity is probably present in the preparation, and it is best to defer the thermal treatment in Step F until the urokinase preparation has been adsorbed onto and eluted from carboxymethylcellulose in accordance with the procedure which would normally follow thermal treatment.

The resulting suspension is now shell-frozen rapidly in a stoppered vessel and stored at −20° C. or less for at least sixteen hours. The frozen-suspension is stable under these conditions for several weeks. Moreover, this freezing procedure permits an excellent subsequent elution of urokinase which is not otherwise possible. Several lots of gel may be accumulated at this range for subsequent pooling prior to further purification.

(E) *Elution of urokinase*

It is preferable to proceed with this part only when time permits continuation without interruption through Part F as well; preliminary evidence of adequate thermostability should also be available before proceeding (cf. Section F).

The buffer in which the $Ca_3(PO_4)_2$ gel was frozen, as described above in Part D, also serves as the eluting medium. The frozen suspension of $Ca_3(PO_4)_2$ gel is thawed carefully and rapidly with the minmium amount of stirring consistent with maintenance of temperature at less than 4° C. The fully thawed suspension is then filtered on a sintered glass funnel (coarse). The residue on the funnel is washed by displacement of entrapped fluid; use a total of 1.5 holdback volumes of 0.3625 M sodium phosphate buffer at pH 6.50±0.02 as the wash fluid. The combined filtrate and wash ordinarily contain about 87–97 percent of the urokinase activity originally present in the bentonite eluate; the solution is colored yellow due to partial elution of adsorbed 6,9-diamino-2-ethoxyacridine lactate monohydrate from $Ca_3(PO_4)_2$. The dissolved 6,9-diamino-2-ethoxyacridine lactate monohydrate is next removed from the combined urokinase eluates by percolation through a bed of suitably equilibrated carboxymethylcellulose, as follows:

(1) For each ml. of eluate can be decolorized, first pretreat 8 mg. of carboxymethylcellulose as described below. Then equilibrate this carboxymethylcellulose against 0.3625 M sodium phosphate buffer at pH 6.50±0.05. Transfer the equilibrated carboxymethylcellulose to a coarse sintered glass filter funnel with the aid of additional quantities of the buffer and permit the funnel contents to drain by gravity. For best results, the bed of equilibrated carboxymethylcellulose should be as high as it is wide.

(2) Allow the combined urokinase eluates to percolate through this bed of carboxymethylcellulose, avoiding channeling and breakthrough of the 6,9-diamino-2-ethoxyacridine lactate monohydrate.

(3) After the urokinase solution has passed through this bed, displace the retained solution with the minimum amount necessary of 0.3625 M sodium phosphate buffer at pH 6.50±0.05. Combine the filtrates and proceed to Part F immediately.

*Preparation of pretreated carboxymethylcellulose*

200 grams of carboxymethylcellulose ("Cellex-CM Cation Exchange Cellulose"—Bio-Rod Laboratories; capacity: 0.4 to 0.6 meq. per gram) is suspended in 4 liters of 0.29 M $Na_2HPO_4$ and stirred for thirty minutes. The carboxymethylcellulose is filtered by gravity through a coarse sintered-glass filter and water is percolated through the bed until the filtrate is neutral. The carboxymethylcellulose is then suspended in 4 liters of 0.145 M $H_3PO_4$ for thirty minutes and again washed on a glass filter until the wash water is neutral. If the carboxymethylcellulose is to be stored, it is stored frozen at −20° C. Just prior to use, the carboxymethylcellulose is equilibrated against the appropriate buffer, i.e., 0.3625 M sodium phosphate in Step E and 0.0725 M sodium phosphate buffer in Steps G and H. Following equilibration, suspend the carboxymethylcellulose in the minimum amount of buffer necessary to permit easy transfer. Concentration of carboxymethylcellulose is calculated on the basis of the original dry weight used.

(F) *Thermal treatment of urokinase preparation*

This step is carried out when it is desired to minimize the possiblility of retaining any pathogenic viruses of urinary origin in the final product. Typically, a loss of urokinase activity of approximately 20 percent is suffered at this stage; a preliminary trial of the effect of thermal treatment should be done to predetermine the extent of loss in each individual lot or pool. The preliminary trial is carried out on either the aliquot portion withdrawn as noted in Part D or a representative pool of such aliquot portions, if several lots are to be pooled.

The decolorized urokinase solution obtained in Part E is now adjusted to a phosphate concentration of 0.50 M by the addition of solid anhydrous $NaH_2PO_4$; the pH is adjusted carefully to 6.25±0.05; stir gently and avoid foam formation. Heat the solution as rapidly as possible to 60° C. ±0.5° C. and maintain this temperature for 10 hours; at no time should any portion of the solution be permitted to exceed the specified temperature. Avoid the need for stirring of the solution during the heating period by appropriate immersion of the urokinase solution in the heating bath. Aliquot samples are withdrawn periodically for assay of urokinase activity. At the end of the heating period, the solution is chilled in an ice-bath below 5° C. Overnight storage at 0° C. is then satisfactory. The small amount of coagulated protein formed during the thermal treatment of the urokinase preparation is removed after the preparation has been chilled by filtration through a sintered glass filter (medium) with the aid of diatomaceous earth (Super Cel—Johns-Manville); not more than 1.0 g. of diatomaceous earth should be necessary for the amount of urokinase derived from 1600 liters of urine. The filtrate is collected in an ice-bath.

(G) *Adsorption of urokinase on carboxymethylcellulose and elution therefrom*

Due to the strong adsorption of urokinase on glass, it is desirable to use vessels of polyethylene or similar non-adsorptive material to hold urokinase solutions when the phosphate concentrations are below 0.29 molar in the subsequent processing.

The filtrate obtained at the end of Step F is diluted with 6 volumes of cold (less than 4° C.) water and carefully titrated to pH 6.00±0.05 with cold 0.0725 M $H_3PO_4$; avoid local excesses of acid and any unnecessary stirring; the stirrer should be of polyethylene or similar material. To the solution, add (with stirring) the below-indicated amount of carboxymethylcellulose which had been pretreated first as indicated in Step E and then equilibrated against 0.0725 M sodium phosphate buffer at pH 6.00±0.05; the amount of carboxymethylcellulose added at this point is 1.0 mg. (dry weight basis) for every 800 CTA units of urokinase; approximately 10 g. of carboxymethylcellulose will be required for the urokinase derived from 1600 liters of urine. Stir gently in an ice-bath for approximately one hour. After the first fifteen minutes of stirring, withdraw an aliquot portion for rapid assay of residual activity in the supernatant fluid obtained after the centrifugation; if assay reveals that more than 7 percent of the total activity remains unadsorbed, add the additional amount of pretreated equilibrated carboxymethylcellulose calculated to be necessary for 93 percent or more adsorption to the main suspension with stirring; the total amount of carboxymethylcellulose used should not exceed 1 mg. (dry weight basis) for every 500 CTA units of urokinase. Thirty to sixty minutes after the last addition of carboxymethylcellulose, the suspension is filtered by gravity through a coarse sintered glass filter; the bed of carboxymethylcellulose is washed on the filter repeatedly with a total of 10 volumes of cold (less than 4° C.) 0.0725 M sodium phosphate buffer at pH 6.00±0.05; avoid channeling. After the final wash, gentle suction is applied to yield a firm but moist cake. The cake is transferred quantitatively to a tared vessel and its weight determined; after subtracting the (dry) weight of the carboxymethylcellulose present in the cake, the weight of entrapped fluid becomes known. An amount of cold (less than 4° C.) 0.51 M sodium phosphate buffer (at pH 6.50±0.05) equal in weight to that of the entrapped fluid is now added. To this suspension, then add a volume of cold 0.29 M sodium phosphate buffer (at pH 6.50±0.05) such that the suspension is estimated to contain 40,000–50,000 CTA units/ml. The suspension is stirred at 0°–4° C. for one hour and then filtered through a medium sintered glass filter. The eluate entrapped within the filter cake is carefully displaced by washing with a minimum volume of cold 0.29 M sodium phosphate buffer at pH 6.50±0.05. The urokinase activity in the combined eluate and wash generally contains 20,000–25,000 CTA units/ml. and generally represents a yield of 85–90 percent of the activity available at the beginning of this step. Aliquot portions of the combined eluate and wash are withdrawn and assayed for specific activity, pyrogenicity, and thromboplastin. The main lot is shell-frozen rapidly, e.g., in a dry-ice bath, and stored at −20° C. or less pending outcome of the assays.

(H) *Optional: Second adsorption of urokinase on carboxymethylcellulose and elution therefrom*

This step is ordinarily undertaken only when further purification of the urokinase preparation at the end of Step G is desired. The technique and procedure of this step resemble those immediately preceding. The frozen solution at the end of Step G is thawed carefully and as rapidly as possible with minimum agitation but without permitting the local temperature of thawed portions to rise above 4° C. The solution is diluted in a polyethylene vessel with 3.00 volumes of cold water to reduce the phosphate concentration to 0.0725 M; the pH is then reduced to 6.00±0.05 by the addition of 0.725 M $H_3PO_4$. With gentle stirring, add 1.0 mg. (dry weight basis) of carboxymethylcellulose (previously pretreated as described in Step E and then equilibrated against 0.0725 M sodium phosphate buffer at pH 6.00±0.05) for every 1000 CTA units of urokinase present. After thirty minutes of gentle stirring, the suspension is filtered and the filter cake is washed as described in Part G. The firm but moist filter cake is weighed and the weight of the entrapped fluid is calculated; a weight of cold 0.51 M sodium phosphate at pH 6.80±0.02 equal in weight to that of the entrapped fluid is added. The suspension is then diluted with a volume of cold (less than 4° C.) sodium phosphate buffer at pH 6.80±0.02 sufficient to yield a suspension estimated to contain 60,000 CTA units/ml. The suspension is stirred intermittently at 0°–4° C. for one hour and then filtered through a medium sintered glass filter with the aid of gentle suction. The filter cake is washed with the minimum amount of cold 0.29 M sodium phosphate buffer at pH 6.80±0.02 required to displace the entrapped eluate. The combined eluate and wash should contain approximately 50,000 CTA units of urokinase/ml., in a yield of more than 90 percent of the urokinase activity available at the start of this step. Aliquot portions are again withdrawn for the requisite assays. The main lot is then shell-frozen rapidly, and stored at −20° C. or less pending assay of the aliquot portions.

(I) *Sterile filtration*

The frozen solution at the end of Section G or H is thawed as previously described in Section H. The pH of the product at the end of Step G is 6.50, whereas at the end of Step H the pH is 6.80. The pH should be adjusted gently to 6.80, if this is necessary, by means of cold N/1 NaOH. An aliquot portion of the thawed solution is withdrawn for essay of urokinase content. The main lot is then filtered aseptically through the smallest Seitz EK filter disc which will give a practical rate of filtration; a filter disc of 5 cm. diameter is adequate for 500 ml. of solution. The filtrate receiver should be in an ice-bath. If clarification should be required prior to this filtration procedure, clarification can be achieved by high-speed refrigerated centrifugation or by filtration through a Seitz K-5 filter (minimum diameter).

(J) Filling, lyophilization, and storage

Filling of vials is based upon the assay results on the aliquot sample withdrawn in Part I; allowance is made for a 5 percent loss during the subsequent filtration and lyophilization operations. Lyophilization is carried out aseptically in standard equipment with the following modifications of standard practice: freezing of filled vials is accomplished as rapidly as equipment capacity permits; vial capacity is 10–15 times the volume of fill; due to the phosphates present, moisture content of lyophilized vials ranges from 3–5 percent; more extensive dehydration is to be avoided. Sealed, finished vials are stored below freezing temperatures.

The following table summarizes the date of yields and specific activity data of urokinase which I obtained following the above-described procedure in 58 runs.

| State of Processing | Average No. of CTA Units of Urokinase Recovered per Liter of Urine | Average Specific Urokinase Activity (CTA Units/ mg. Protein) |
|---|---|---|
| Pooled Urines | 6,850 | <34 |
| Bentonite Eluate | 6,600 | (*) |
| (E) Decolorized Ca₃(PO₄)₂ Eluate | 6,300 | 6,000–8,000 |
| (F) Heated Solution | 4,700 | |
| (G) Carboxymethylcellulose Eluate | 4,000 | 30,000–35,000 |
| (H) Second Carboxymethylcellulose Eluate | 3,600 | 50,000–55,000 |

*Not readily determinable.

Urine samples and bentonite eluates were generally assayed by the fibrin plate procedure. The remaining four samples were assayed by a reproducible procedure patterned after Fletcher's assay procedure for plasmin. It is of course difficult to obtain precise assay values for urine samples owing to the variable content of urokinase inhibitors, salts, proteolytic enzymes and other factors which affect the assay results.

EXAMPLE 2

(A) 535 liters of normal human male urine, collected in the course of the preceding day and stored under refrigeration at approximately 4° C. in the interim, was chilled to a temperature between 0° C. and 2° C. in a stainless steel kettle, and the pH of the urine was adjusted to 5.0±0.05 by addition of glacial acetic acid. Stirring of the urine in the cold was then continued for one hour, during which period a precipitate formed. This precipitate was isolated by centrifugation for ten minutes at 1500 g. at 0° C. There was thus collected 500 ml. of moist precipitate which consisted largely of urates, uric acid, and mucoproteins having adsorbed thereon or otherwise contained therein essentially all of the urokinase present in the urine used as the starting material. The supernatant obtained in the centrifugation procedure was discarded. The 500 ml. of moist precipitate, which was designated Fraction A, was frozen and was stored in the frozen state until further processing was begun.

The foregoing procedure was repeated with two more 535 liter batches of normal human male urine, so that there were obtained the frozen precipitates from a total of approximately 1600 liters of normal human male urine, which by assay contained 10,900,000 CTA units of urokinase.

(B) The frozen precipitate (Fractions A) obtained as described in Part A above were combined and thawed and then washed by trituration with 80 liters of cold water. The pH of the resulting suspension was adjusted to 3.8 by addition of N/2 hydrochloric acid and the suspension was cooled and stirred for fifteen minutes. The suspension was then centrifuged. The supernatant was discarded and the residue was washed by trituration with a second 80 liter portion of cold water and centrifugation of the resulting suspension at pH 3.8, the supernatant being discarded. Urokinase was eluted from the washed precipitate in the following manner. The precipitate was triturated with 12 liters of water at 20° C., and the pH of the resulting suspension was adjusted to 2.0 by addition of N/1 hydrochloric acid. To this suspension there was added 4000 ml. of a 1 percent aqueous solution of 6,9-diamino-2-ethoxyacridine lactate monohydrate which had been adjusted to pH 2.0 by addition of N/1 hydrochloric acid and had been cooled to 20° C. Elution of the urokinase was effected by stirring the mixture for thirty minutes, keeping the temperature at 20° C.±2° C. and the pH at 2.0. The mixture was then centrifuged at 1500×g. for approximately one-half hour at 0–4° C. The resulting precipitate was discarded and the supernatant, which contained the urokinase, was chilled to 0–4° C. Sufficient sodium chloride (80 g.) was added to produce a concentration of 0.5 percent (weight/volume), and the pH was adjusted to 6.5±0.05 by addition of N/1 sodium hydroxide solution. There were then added 2.3 volumes of anhydrous ethyl alcohol (alternatively, 2.9 volumes of 95 percent ethyl alcohol are used) which had been chilled to −35° C., the resulting mixture being cooled when necessary to keep the temperature from rising above 4° C. Fifteen minutes after addition of the ethyl alcohol, the precipitate which had formed was colected by centrifugation for twenty minutes at 1500×g at 0° C. This precipitate was homogenized in an equal volume of cold (0–4° C.) water and then the mixture was diluted with cold water to a volume of 12 liters. This dilution apparently dissolved all of the precipitate. The pH of the resulting solution, which was approximately 7.0, was adjusted to 5.00±0.02 by addition of N/1 hydrochloric acid with stirring in an ice bath. (In some instances, it was found advantageous to adjust the pH first to 4.2–4.5 and then to 5.00±0.02 to obtain oputimum yield to the urokinase-containing fraction.) After stirring the mixture for thirty minutes, the precipitate which had formed was collected by centrifugation for ten minutes at 1500×g at 0° C. The supernatant was discarded. The collected precipitate, which was designated Fraction B, had approximately 85 percent of the urokinase activity present in the Fractions A above. Fraction B was frozen and stored at −20° C. until the next step (Step C) was begun.

In each of the subsequent processing steps, only pyrogen-free equipment and reagents, including water, coming into contact with the urokinase-containing fractions were used.

(C) The frozen precipitate (Fraction B) obtained in Part B above was thawed and was then dissolved in 12 liters of cold water by the addition of N/1 hydrochloric acid until the pH of the solution was 3.0, with stirring and cooling in an ice-bath during this addition. Reprecipitation of the urokinase-containing fraction was then effected by adding N/1 sodium hydroxide solution until the pH was 5.00±0.02. The resulting suspension was centrifuged for ten minutes at 1500×g at 0° C. The supernatant was discarded. In the same manner, the precipitate was dissolved by addition of hydrochloric acid, reprecipitated by adding soduim hydroxide solution, and collected by centrifugation three more times, the supernatant being discarded in each instance. The final precipitate obtained in this fashion was designated as Fraction C. Pending use in the next step (Step D), Fraction C was stored in the frozen state.

(D) The frozen precipitate (Fraction C) obtained as described in Part C above was thawed and was then homogenized in 6 liters of a 0.25 percent aqueous solution of 6,9-diamino-2-ethoxyacridine lactate monohydrate which had been adjusted to pH 5.00±0.02 by addition of N/1 phosphoric acid and the resulting mixture was stirred for thirty minutes at approximately 25° C. ±5° C. The precipitate was isolated by centrifugation for thirty minutes at 1500 g at 0° C. and was discarded. The supernatant, which had approximately 95 percent of the urokinase activity present in Fraction C above, was diluted to a concentration of approximately 7000 units of urokinase per ml. by the addition of 7 liters of a 0.25 percent aqueous solution of 6,9-diamino-2-ethoxyacridine lactate monohydrate which had been adjusted at pH 5.00±0.02 by addition of N/1 phosphoric acid. A calcium phosphate gel was prepared as follows: 535 g. of calcium chloride was dissolved in 35 liters of water, and this solution was added to a solution of 1225 g. of $Na_3PO_4 \cdot 12H_2O$ in 35 liters of water; the resulting mixture was stirred for thirty minutes in an ice bath, and the gel which had formed was collected by centrifugation for ten minutes at 1500×g at 0° C.; the gel thus collected, which had a volume of approximately 15 liters, was suspended in 40 liters of 0.0725 M $NaH_2PO_4$, the suspension was stirred for thirty minutes, and the gel was again collected by centrifugation; and the gel was then washed with two 40 liter portions of water and was suspended in sufficient water to yield a total volume of 20 liters, which had 25 g. of $Ca_3(PO_4)_2$ per liter. The gel suspension prepared in this manner was added with stirring to the urokinase containing preparation in a ratio of one volume of the former to seven volumes of the latter, corresponding to a ratio of approximately 1 mg. of $Ca_3(PO_4)_2$ per 2000 units of urokinase. After this mixture had been stirred for thirty minutes, the resulting gel was isolated by centrifugation and washed with ten volumes of water. The gel thus collected was weighed and an equal weight of 0.58 M sodium phosphate solution (pH 6.5±0.02) was added, and then 0.29 M sodium phosphate solution was added to yield a homogeneous suspension containing approximately 50,000 units of urokinase per ml. This suspension was shell-frozen and was stored at −20° C. overnight. The suspension was then thawed and was centrifuged for thirty minutes at 1500×g at 0° C., the supernatant being collected and retained. The precipitate was washed with an equal volume of a cold 0.29 M $NaH_2PO_4$ solution (pH 6.5) twice. The supernatant and the wash liquors, which were yellow due to presence of a small amount of 6,9-diamino-2-ethoxyacridine were combined; this solution contained approximately 90 percent of the urokinase activity present in Fraction C above. (In a series of preparations, the yields fell in the range 87 percent to 97 percent.) The yellow liquid was decolorized by removing the 6,9-diamino-2-ethoxyacridine therefrom by percolation through a bed of equilibrated carboxymethylcellulose prepared as follows: 2000 g. of carboxymethylcellulose ion-exchanger (exchange capacity: 0.4 to 0.9 milliequivalent per gram) was suspended in 40 liters of a 0.29 M $Na_2HPO_4$ solution and the resulting suspension was stirred for thirty minutes. The suspension was filtered by gravity through a coarse sintered-glass filter, and water was percolated through the solid thus collected until the filtrate was neutral. The solid was suspended in 40 liters of 0.145 M $H_3PO_4$ for thirty minutes, and the suspension was again filtered through a coarse sintered-glass filter and the carboxymethylcellulose was washed with water until the wash water was neutral. (If it is desired to store the carboxymethylcelluose, it is frozen at this stage and stored frozen at −20° C.) This pretreated carboxymethylcellulose, in the amount of 8 mg. per ml. of the combined yellow liquid obtained as above described, was equilibrated against a 0.29 M sodium phosphate solution (pH 6.5), and the equilibrated carboxymethylcellulose thus obtained was transferred to a coarse sintered-glass filter with the aid of additional 0.29 M sodium phosphate solution (pH 6.5). The wet bed of carboxymethylcellulose was allowed to drain by gravity; the bed was approximately 1 inch high and approximately 2 inches wide. The yellow, urokinase-containing liquid was percolated through the carboxymethylcellulose bed, followed by a 0.29 M sodium phosphate solution (pH 6.5) to wash the bed. The percolate thus obtained, which was designated Fraction D, was substantially colorless and was free of 6,9-diamino-2-ethoxyacridine. This fraction was processed in the next step (Step E) below without delay.

(E) Fraction D obtained in Part D above was diluted with three volumes of water at 0–4° C., thereby reducing the phosphate concentration to 0.0725 M, and the diluted solution was titrated to pH 6.0±0.05 with 0.0725 M $H_3PO_4$. Pretreated carboxymethylcellulose, obtained as described above in Part D, was equilibrated against 0.0725 M sodium phosphate buffer at pH 6.0±0.05 and was added to the urokinase-containing solution in the amount of 1 mg. (dry weight basis) of carboxymethylcellulose per 800 CTA units of urokinase. After stirring the mixture for fifteen minutes, a small aliquot was withdrawn and centrifuged, and the urokinase activity remaining in the supernatant was estimated by rapid assay to be approximately 5 percent of the amount in Fraction E. (In any instance when this assay indicated a value of more than 5 percent, an additional amount of equilibrated carboxymethylcellulose was added to the main suspension; the total amount of carboxymethylcellulose, on a dry weight basis, did not in any case exceed 1 mg. per 500 CTA units of urokinase.) The main suspension was then filtered by gravity through a coarse sintered-glass filter. The precipitate thus collected was washed on the filter with a total of ten volumes of a cold 0.0725 M sodium phosphate solution (pH 6.0±0.05), and gentle suction was applied in the filtration until a firm, moist cake was obtained. The moist cake was weighed and the volume of the fluid trapped in the cake was calculated to be 6.5 ml. The moist cake was then suspended in 6.5 ml. of a cold 0.51 M sodium phosphate solution (pH 6.00±0.05), and a sufficient volume (70 ml.) of a cold 0.29 M sodium phosphate solution (pH 6.00±0.05) was added to yield a suspension containing approximately 50,000 CTA units of urokinase per ml. The resulting suspension was stirred for one hour at 0° C. and was then filtered through a medium sintered-glass filter. The eluate trapped within the filter cake was displaced by washing with 100 ml. of a cold 0.29 M sodium phosphate solution (pH 6.00±0.05). The eluate and wash liquid were combined and designated as Fraction E; this fraction had a volume of 230 ml. and contained 37,000 CTA units of urokinase per ml. The urokinase activity in Fraction E was 85 percent of that present in Fraction D. Fraction E was frozen and stored at −20° C. until processed further.

(F) For the purpose of inactivating any viruses, for instance hepatitis virus, which might be present, Fraction E was treated as follows. The fraction was thawed and the 0.29 M phosphate concentration therein was raised to 0.50 M by the addition of $Na_2HPO_4$. The solution thus obtained, which had a pH of 6.8, was heated at 60.0° C. ±0.5° C. for ten hours. The solution resulting from this treatment was designated as Fraction F; it had 70 percent of the urokinase activity of Fraction E. Fraction F was chilled in an ice bath and was stored overnight at 0° C.

(G) Fraction F was diluted with cold distilled water to reduce the phosphate concentration from 0.50 M to 0.0725 M, and the pH of the diluted solution was reduced to 6.00±0.05 by the addition of 0.0725 M $H_3PO_4$. The resulting solution was stirred in an ice bath and there was then added equilibrated carboxymethylcellulose, which was prepared by equilibrating pretreated carboxymethylcellulose (obtained by the procedure described in Part D) against 0.0725 M sodium phosphate solution at pH 6.00 ±0.05, in the amount of 1.0 g. (dry weight basis) per 1,000,000 CTA units of urokinase in the solution. After the mixture was stirred for thirty minutes, it was filtered and washed in the manner described in Step E above. The resultant moist cake was weighed, and the volume of fluid trapped in the cake was calculated to 33 ml. The moist cake was then suspended in 33 ml. of a cold 0.51 M sodium phosphate solution (pH 6.80±0.02) and a sufficient volume (20 ml.) of a cold 0.29 M sodium phosphate solution (pH 6.80±0.02) was added to yield a suspension containing approximately 60,000 CTA units of urokinase per ml. This suspension was stirred intermittently for one hour at 0° C. and then was filtered through a medium sintered-glass filter. The eluate trapped within the filter was displaced by washing with 40 ml. of a cold 0.29 M sodium phosphate solution (pH 6.80±0.02). The eluate and wash liquid were combined and designated as Fraction G. This fraction had a volume of 110 ml. and contained 49,000 CTA units of urokinase per ml. The urokinase activity in Fraction G was 91 percent of that present in Fraction F. Fraction G was frozen and stored at −20° C. until it was processed further.

(H) Fraction G was thawed and was then filtered aseptically through a Seitz-EK filter to sterilize it. The sterile solution was lyophilized.

EXAMPLE 3

The sequence of steps described above in Steps A–H inclusive in Example 1 was repeated with the exception that Step F, the thermal treatment, was omitted. With gentle stirring, two volumes of cold (0°–4° C.) saturated ammonium sulfate solution was added to the eluate obtained at the end of Step H. The mixture was stored in the cold for one hour and the urokinase fraction which precipitated was isolated by refrigerated high-speed centrifugation (15,000 r.p.m. for twenty minutes in a Servall centrifuge). The supernatant fluid was decanted and discarded. The precipitate was dispersed in 0.29 M sodium phosphate buffer at pH 6.5 to yield a concentration of $3 \times 10^5$ CTA units per ml. The mixture was dialyzed at 0°–4° C. against frequent changes of distilled water in an efficient dialysis assembly until the specific resistance of the urokinase solution increased to 2500 ohms. When the conductivity had been reduced by dialysis as indicated, a substantially inert (usually crystalline) precipitate was present in suspension and the pH was 6.6. This suspension was centrifuged and the precipitate was discarded. While using gentle but efficient stirring, the pH of the supernatant fluid was adjusted to 7.00 with 0.1 N NaOH at 0°–4° C. and the preparation was observed for additional precipitation after a fifteen minute period. Clarify the solution, if necessary, by centrifugation. (Yield of urokinase activity: 85–90 percent of that present at Step H.) To every 10 ml. of clear urokinase solution, there was added 0.2 g. of solid sodium chloride, and the pH of the solution was adjusted carefully to 5.30±0.05 with 0.1 N HCl. The solution was saturated with solid sodium chloride and the resulting suspension was stored at 0°–4° C. overnight. The urokinase thus precipitated was isolated by centrifugation. (The average yield of the urokinase activity during this step was 83 percent.) The urokinase precipitate was dissolved in 10 percent aqueous sodium chloride solution at 4° C. to yield a solution containing approximately 150,000 CTA units per ml.; the pH of the solution was adjusted to 5.00±0.05. Solid sodium chloride was added in amount sufficient to yield half-saturated sodium chloride and the solution was centrifuged to remove insoluble matter. Additional solid sodium chloride was then added to the urokinase solution at 4° C. until the solution had a faintly turbid appearance; shortly, a "silky" sheen became evident on gentle stirring. The sodium chloride concentration was then increased gradually over a period of several days until 98 percent saturation was attained.

The urokinase crystals which separated from solution as a result of the foregoing procedure were colorless, thin plates of unusual fragility and brittleness; under the microscope, they were easily shattered into fragments by the application of only moderate pressure to the cover slip.

When the singly crystallized preparation above was recrystallized twice more, the specific urokinase activity reached a constant maximum value (in further runs it was found that two or three recrystallizations were generally sufficient for this purpose). A mean yield loss amounting to 12 percent of the total urokinase activity was sustained with each recrystallization. The maximum specific activity attained with each of three lots of crystals was 652,000±29,800 (s.d.) CTA units per mg. of nitrogen (Kjeldahl), or 104,000±4,800 (s.d.) CTA units per mg. of estimated protein. (Protein concentration was calculated to be 6.25 times the nitrogen concentration; nitrogen concentration was determined by the micro-Kjeldahl procedure. A solution of the crystalline urokinase containing 0.100 mg.N/ml. exhibited an optical density of 0.853 at 280 m$\mu$ in 1.00 cm. cuvettes.)

Twenty-nine milligrams of crystalline urokinase were obtained from 600 gallons of human male urine, representing an overall yield of 24 percent. When subjected to polyacrylamide gel disc electrophoresis, solutions of this crystalline human urokinase revealed only a single sharply defined component. The crystalline human urokinase was also examined for homogeneity in the ultracentrifuge. All ultracentrifuge studies were conducted at 10.0° C. in a Spinco model E analytical ultracentrifuge equipped with a phase plate, schlieren optical system, and a rotor temperature indicator and control unit. Sedimentation patterns of solutions of crystalline urokinase were obtained at (A) pH 2.1 and (B) pH 6.8 in synthetic boundary runs. The synthetic boundaries were formed 12 minutes before the rotor speed reached 59,780 r.p.m.; schlieren diaphragm angle, 60°. In Run A urokinase concentration corresponded to O.D. 280 m$\mu$=4.05 in 0.21 M NaCl, 0.07 phosphate at pH 2.1; patterns were photographed at twenty-two, sixty-two, and ninety-four minutes, resp., after rotor speed reached 59,780 r.p.m. In Run B urokinase concentration corresponded to O.D. 280 m$\mu$=4.22 in 0.21 M NaCl, 0.07 phosphate at pH 6.8; patterns were photographed at thirteen, fifty-three, and eighty-five minutes, resp., after rotor speed reached 59,780 r.p.m.

The runs at pH 2.1 and at pH 6.8 revealed only a single symmetrical boundary in each instance. However, in the run at pH 6.8 the boundary exhibited a relatively rapid and somewhat excessive broadening as it traversed the cell; moreover, the apparent diffusion coefficients calculated from ultracentrifuge data were somewhat dependent on the magnitude of the centrifugal field. While the presence of only a single symmetrical peak in the sedimentation patterns of course indicated the homogeneity of the urokinase preparations, the relatively rapid and progressive boundary broadening observed at pH 6.8 suggested polydispersity at that pH.

In order to reconcile the homogeneity of crystalline urokinase which was apparent on sedimentation at pH 2.1 with the polydispersity apparent at pH 6.8, it was assumed that, at the latter pH value, urokinase undergoes relatively rapidly equilibrating association-dissociation reactions. If the rate of adjustment of the association-dissociation equilibrium were not greater than the rate of ultracentrifugal separation of the different molecular species (monomers, dimers, etc.), more than one boundary would have been evident during sedimentation. In associating-dissociating systems involving a single component, the sedimentation boundary moves with a weight-average mobility; moreover, the boundary is the site of continually readjusting equilibria owing to concentration changes throughout the boundary. At the trailing edge of the boundary, where the protein concentration is low, dissociation into the monomeric form is, of course, favored. Since the monomeric molecules sediment less rapidly than the average material in the plateau region ahead of the boundary, the monomers lag behind and cause the boundary to be broader than that which would result if only the monomers were present. Confirmatory evidence of the tendency of crystalline urokinase to aggregate reversibly in solution at pH 6.8 was obtained by establishing the concentration-dependence of the weight-average molecular weight of the enzyme in solutions at this pH value. In this series of studies, molecular weights were calculated by means of the Archibald equation (J. Phys. and Colloid Chem., 51, 1204 (1947)):

$$M_w = \frac{RT}{(1-\overline{V}\rho)\omega^2} \frac{(dc/dx)_m}{x_m c_m}$$

in which R is the gas constant, $8.314 \times 10^7$ ergs/mole/degree; T is the absolute temperature; $\rho$ is the density of the solution; $\omega$ is the angular velocity of the centrifuge rotor in radians per second, (r.p.m.) $(2\pi)/60$; $x_m$ is the distance of the meniscus from the axis of rotation; $c_m$ and $(dc/dx)_m$ are the concentration and concentration gradient at the meniscus; $\overline{V}$ is the partial specific volume of urokinase and is assumed to be 0.735 ml./g. at 10° C. The meniscus concentration, $c_m$, was calculated by the equation of Klainer and Kegeles (19):

$$c_m = c_0 - \frac{1}{x_m^2} \int_{x_m}^{X} x^2 \left(\frac{dc}{dx}\right) dx$$

in which $c_0$ is the initial urokinase concentration in optical units, as determined in synthetic boundary runs in the ultracentrifuge; X is a position in the plateau region (throughout which $dc/dx$ equals zero). Experimental measurements were made in accordance with the procedure of Schachman (Methods in Enzymology, vol. IV, S. P. Colowick and N. O. Kaplan, Editors, Academic Press, New York, 1957, p. 32). In essence, the Archibald method is applicable during the approach to sedimentation equilibrium in an ultracentrifugal field. It permits the determination of the weight-average molecular weight of the solute molecules present at the meniscus of a solution when the concentration distribution in the region of the meniscus is known.

The molecular weight data which were obtained over a range of meniscus concentrations of urokinase at pH 6.8 made it evident that the reciprocal of the weight-average molecular weight was linearly related to concentration over the range of concentration studied at pH 6.8. Least square treatment of the data yielded the following equation for the regression line:

$$\frac{10^5}{M_w} = 1.853 - 0.0864(c)$$

in which $c$ is the urokinase concentration expressed in terms of the optical density at 280 m$\mu$ in 1.00 cm. cells. Thus, at infinite dilution, a value of $54,000 \pm 900$ (s.e.) was obtained for the molecular weight of monomeric urokinase; this value was, of course, predicated on the assumption that the partial specific volume was 0.735 ml./g. at 10° C.

Molecular weight studies similar to those performed at pH 6.8 were also performed on urokinase solutions at pH 2.1 and at pH 10.5. Within the limits of experimental precision, no concentration dependence of the apparent molecular weight was observed at either of the latter two pH values over the concentration ranges studied. At pH 2.1, the mean value and the standard eror for a series of eleven determinations of molecular weight were found to be $52,500 \pm 530$. At pH 10.5, the mean value and the standard error for a series of eight determinations were found to be $53,300 \pm 440$. Each of these values was in good agreement with the value of $54,000 \pm 900$ derived by extrapolation of the data at pH 6.8 to infinite dilution. Presumably, aggregation was inhibited at the more extreme pH values by the repulsive effects of the electrostatic charges on the monomeric molecules; alternatively, it is possible that relatively minor degrees of aggregation were masked by a non-ideal behavior of the solutions or by analytical insensitivity.

The experimental design of the molecular weight studies at each pH value was such that it also provided a further test of the homogeneity of the crystalline urokinase preparations; moreover, at each pH value, the design permitted the examination of a single sample over a rather broad range of meniscus concentrations. During the Archibald determinations, each of several different initial concentrations of urokinase was subjected to three different centrifugal fields. In ultracentrifugally polydisperse systems, the higher centrifugal fields cause a preferential depletion of the more rapidly sedimenting molecular species from the region of the meniscus. When the polydispersity is due to reversible aggregation, such preferential depletion leads to a reequilibration of the molecular species to yield a solution whose composition is identical with that attained by simple dilution to the same solute concentration. The weight-average molecular weight of the solute at the meniscus of such systems, while concentration-dependent, is independent of whether the reduction in concentration is achieved primarily by simple dilution or by ultracentrifugal fractionation. Such was found to be the case with urokinase solutions at pH 6.8. At each of the other two pH values studied, the homogeneity of crystalline urokinase was further indicated by the lack of any detectable dependence of the Archibald molecular weight values upon the magnitude of the applied centrifugal fields.

The hereinabove described methods of my invention afford highly purified urokinase preparations which were substantially free of pyrogens and thromboplastic substances, and which were found to be effective in the dissolution of intravascular clots in humans. Moreover, the crystalline urokinase herein described was not only substantially free of pyrogens and thromboplastic substances but was also free of potentially antigenic impurities, so that crystalline urokinase can be used repeatedly in humans without the hazard of severe allergic reactions.

In the prior art, the potency of urokinase preparations has been expressed in terms of several different activity units, each being based on a particular method of standardization. The CTA unit used herein refers to the standard urokinase unit recently adopted by the Committee on Thrombolytic Agents, National Heart Institute; see Sherry, Alkjaersig, and Fletcher, J. Lab. & Clin. Med., 64, 145–153 (July 1964).

I claim:

1. The method of obtaining urokinase which comprises: treating mammalian urine with a reagent causing formation of a urokinase-containing precipitate; collecting the urokinase-containing precipitate and eluting urokinase therefrom with a dilute aqueous solution of 6,9-diamino-2-ethoxyacridine; contacting the resulting eluate with calcium phosphate gel, whereby the urokinase, pyrogens, and a minor proportion of the 6,9-diamino-2-ethoxyacridine are adsorbed onto the calcium phosphate gel, and then collecting the gel, suspending it in a sodium phosphate buffer and freezing the mixture and thereafter thawing it, whereby the urokinase and a small portion of the 6,9-diamino-2-ethoxyacridine are eluted from the gel into the phosphate buffer and a major proportion of the pyrogens remains adsorbed on the gel; contacting the urokinase-containing eluate with carboxymethylcellulose, which adsorbs the remainder of the 6,9-diamino-2-ethoxyacridine; separating the carboxymethylcellulose with 6,9-diamino-2-ethoxyacridine adsorbed thereon from the urokinase-containing solution; adjusting the molar concentration of sodium phosphate in the urokinase-containing solution to a value no greater than 0.15, and contacting the resulting solution at a pH in the aproximate range 5.0 to 6.5 with carboxymethylcellulose, which adsorbs the urokinase; and eluting the urokinase from the carboxymethylcellulose.

2. The method of obtaining urokinase which comprises: treating mammalian urine with a reagent causing formation of a urokinase-containing precipitate; collecting the urokinase-containing precipitate and eluting urokinase therefrom with a dilute aqueous acidic solution of 6,9-diamino-2-ethoxyacridine; contacting the resulting eluate with calcium phosphate gel at a pH in the approximate range 6.0–7.0, whereby the urokinase, pyrogens, and a minor proportion of the 6,9-diamino-2-ethoxyacridine are adsorbed onto the gel, and then collecting the gel, suspending it in a sodium phosphate buffer at a pH in the approximate range 6.0–7.0 wherein the molar concentration of the sodium phosphate is in the approximate range 0.25 to 0.50; freezing the resulting suspension and thereafter thawing it, whereby the urokinase and a small proportion of the 6,9-diamino-2-ethoxyacridine are eluted from the gel into the phosphate buffer and a major proportion of the pyrogens remains adsorbed on the gel; contacting the urokinase-containing eluate with carboxymethylcellulose which adsorbs the remainder of the 6,9-diamino-2-ethoxyacridine; separating the carboxymethylcellulose with 6,9-diamino-2-ethoxyacridine adsorbed thereon from the urokinase-contaning solution; adjusting the molar concentration of sodium phosphate in the urokinase-containing solution to a value no greater than 0.15, and contacting the resulting solution at a pH in the approximate range 5.0 to 6.5 with carboxymethylcellulose, which adsorbs the urokinase; and eluting the urokinase from the carboxymethylcellulose with a sodium phosphate buffer at a pH in the approximate range 6.0 to 7.0 wherein the molar concentration of sodium phosphate is at least 0.25.

3. The method of obtaining urokinase which comprises: contacting mammalian urine with bentonite, whereby urokinase is adsorbed from the urine onto the bentonite; collecting the bentonite with urokinase adsorbed thereon and eluting the urokinase from the bentonite with a dilute aqueous solution of 6,9-diamino-2-ethoxyacridine; contacting the resulting eluate with calcium phosphate gel at a pH in the approximate range 6.0 to 7.0, whereby the urokinase, pyrogens, and a minor proportion of the 6,9-diamino-2-ethoxyacridine are adsorbed onto the gel, and then collecting the gel, suspending it in a sodium phosphate buffer at a pH in the approximate range 6.0 to 7.0 wherein the molar concentration of sodium phosphate is at least 0.25; freezing the resulting suspension and thereafter thawing it, whereby the urokinase and a small proportion of the 6,9-diamino-2-ethoxyacridine are eluted from the gel into the phosphate buffer and a major proportion of the pyrogens remains adsorbed on the gel; contacting the urokinase-containing eluate with carboxymethylcellulose which adsorbs the remainder of the 6,9-diamino-2-ethoxyacridine; separating the carboxymethylcellulose with 6,9-diamine-2-ethoxyacridine adsorbed thereon from the urokinase-containing solution; adjusting the molar concentration of sodium phosphate in the urokinase-containing solution to a value no greater than 0.15; and contacting the resulting solution at a pH in the approximate range 5.0 to 6.5 with carboxymethylcellulose, which adsorbs the urokinase; and eluting the urokinase from the carboxymethylcellulose.

4. The method of obtaining urokinase which comprises: contacting mammalian urine with bentonite, whereby urokinase is adsorbed from the urine onto the bentonite; collecting the bentonite with urokinase adsorbed thereon and eluting the urokinase from the bentonite with a dilute aqueous acidic solution of 6,9-diamino-2-ethoxyacridine; contacting the resulting eluate with calcium phosphate gel at a pH in the approximate range 6.0–7.0, whereby the urokinase, pyrogens, and a minor proportion of the 6,9-diamino-2-ethoxyacridine are adsorbed onto the gel, and then collecting the gel, suspending it in a sodium phosphate buffer at a pH in the approximate range 6.0–7.0 wherein the molar concentration is in the approximate range 0.25–0.50, and freezing the mixture and thereafter thawing it, whereby the urokinase and a small proportion of the 6,9-diamino-2-ethoxyacridine are eluted from the gel into the phosphate buffer and the major proportion of the pyrogens remains adsorbed on the gel; contacting the urokinase-containing eluate with carboxymethylcellulose, which adsorbs the remainder of the 6,9-diamino-2-ethoxyacridine; separating the carboxymethylcellulose with 6,9-diamino-2-ethoxyacridine adsorbed thereon from the urokinase-containing solution; adjusting the molar concentration of sodium phosphate in the urokinase-containing solution to a value no greater than 0.15, and contacting the resulting solution at a pH in the approximate range 5.0 to 6.5 with carboxymethylcellulose, which adsorbs the urokinase; and eluting the urokinase from the carboxymethylcellulose with a sodium phosphate buffer at a pH in the approximate range 6.0 to 7.0 wherein the molar concentration of the sodium phosphate is at least 0.25.

5. The method of obtaining urokinase which comprises: adjusting the pH of mammalian urine to a value in the approximate range 4 to 5.5; collecting the urokinase-containing precipitate which forms and eluting urokinase therefrom with a dilute aqueous solution of 6,9-diamino-2-ethoxyacridine; contacting the resulting eluate with calcium phosphate gel at a pH in the approximate range 6.0–7.0, whereby the urokinase, pyrogens, and a minor proportion of the 6,9-diamino-2-ethoxyacridine are adsorbed onto the calcium phosphate gel, and then collecting the gel, suspending it in a sodium phosphate buffer at a pH in the approximate range 6.0–7.0 wherein the molar concentration of sodium phosphate is at least 0.25; and freezing the resulting suspension and thereafter thawing it, whereby the urokinase and a small proportion of the 6,9-diamino-2-ethoxyacridine are eluted from the gel into the phosphate buffer and the major proportion of the pyrogens remains adsorbed on the gel; contacting the urokinase-containing eluate with carboxymethylcellulose, which adsorbs the remainder of the 6,9-diamino-2-ethoxyacridine; separating the carboxymethylcellulose with 6,9-diamino-2-ethoxyacridine adsorbed thereon from the urokinase-containing solution; adjusting the molar concentration of sodium phosphate in the urokinase-containing solution to a value no greater than 0.15, and contacting the resulting solution at a pH in the approximate range 5.0 to 6.5 with carboxymethylcellulose, which adsorbs the urokinase; and eluting the urokinase from the carboxymethylcellulose.

6. In a method of obtaining urokinase which comprises the steps of: treating mammalian urine with a reagent causing formation of a urokinase-containing precipitate; collecting the urokinase-containing precipitate; and eluting the urokinase from said precipitate, the improvement which comprises eluting the urokinase from the urokinase-containing precipitate with a dilute aqueous solution of 6,9-diamino-2-ethoxyacridine.

7. In a method of obtaining urokinase which comprises the steps of: treating mammalian urine with a reagent causing formation of a urokinase-containing precipitate; collecting the urokinase-containing precipitate and eluting the urokinase from said precipitate, the improvement which comprises eluting the urokinase from the urokinase-containing precipitate with a dilute aqueous solution of 6,9-diamino-2-ethoxyacridine having a pH in the approximate range 2 to 5.

8. The method of obtaining urokinase which comprises: contacting mammalian urine with bentonite, whereby urokinase is adsorbed from the urine onto the bentonite; collecting the bentonite with urokinase adsorbed thereon; and eluting the urokinase from the bentonite a dilute aqueous solution of 6,9-diamino-2-ethoxyacridine.

9. The method of obtaining urokinase which comprises: contacting mammalian urine with bentonite, whereby urokinase is adsorbed from the urine onto the bentonite; collecting the bentonite with urokinase adsorbed thereon; eluting the urokinase from the bentonite with a dilute aqueous acidic solution of 6,9-diamino-2-ethoxyacridine; and recovering the urokinase from the eluate.

10. In a method of obtaining urokinase which comprises the steps of: adjusting the pH of mammalian urine to a value in the approximate range 4 to 5.5; collecting the urokinase-containing precipitate which forms; and eluting the urokinase from said precipitate, the improvement which comprises eluting the urokinase from the urokinase-containing precipitate with a dilute aqueous solution of 6,9-diamino-2-ethoxyacridine.

11. In a method of obtaining urokinase which comprises the steps of: adjusting the pH of mammalian urine to a value in the approximate range 4 to 5.5; collecting the urokinase-containing precipitate which forms; and eluting the urokinase from said precipitate, the improvement which comprises washing the urokinase-containing precipitate thoroughly with acidulated water at a pH in the approximate range 3.2–5.5 and then eluting the urokinase from the thus-washed precipitate with acidulated water at a pH in the approximatel range 1.5.

12. The method for the removal of pyrogens from aqueous urokinase solutions which comprises: contacting a pyrogen-containing aqueous urokinase solution with calcium phosphate gel having 6,9-diamino-2-ethoxyacridine adsorbed thereon, whereby the urokinase and the pyrogens are adsorbed onto the gel; collecting the gel wtih urokinase, pyrogens, and 6,9-diamino-2-ethoxyacridine adsorbed thereon; and eluting urokinase therefrom.

13. The method for the purification of aqueous urokinase solutions which comprises: contacting a pyrogen-containing aqueous urokinase solution at a pH in the approximate range 6.0–7.0 with calcium phosphate gel having 6.9-diamino-2-ethoxyacridine adsorbed thereon, whereby the urokinase and the pyrogens are adsorbed onto the gel; collecting the gel, suspending it in a sodium phosphate buffer and freezing the mixture and thereafter thawing it, whereby the urokinase and a small proportion of the 6,9-diamino-2-ethoxyacridine are eluted from the gel into the phosphate buffer and the major proportion of the pyrogens remains adsorbed on the gel; and removing the remainder of the 6,9-diamino-2-ethoxyacridine from the urokinase-containing eluate.

14. The method for the removal of pyrogens from aqueous urokinase solutions which comprises: contacting a pyrogen-containing aqueous urokinase solution at a pH in the approximate range 6.0–7.0 with calcium phosphate gel having 6,9-diamino-2-ethoxyacridine adsorbed thereon, whereby the urokinase and the pyrogens are adsorbed onto the gel; collecting the gel, suspending it in a sodium phosphate buffer at a pH in the approximate range 6.0 to 7.0 wherein the concentration of sodium phosphate is at least 0.25, freezing the resulting suspension and thereafter thawing it, whereby the urokinase and a small proportion of the 6,9-diamino-2-ethoxyacridine are eluted from the gel into the phosphate buffer and the major proportion of the pyrogens remains adsorbed on the gel; and contacting the urokinase-containing eluate with carboxymethylcellulose, which removes the remainder of the 6,9-diamino-2-ethoxyacridine.

15. The method for purification of urokinase which comprises: adsorbing urokinase from an aqueous solution containing at least 500 CTA units of urokinase per milliter of solution at a pH in the approximate range 5.0 to 6.5 onto carboxymethylcellulose; and collecting the carboxymethylcellulose with urokinase adsorbed thereon and eluting the urokinase therefrom.

16. The method for purification of urokinase which comprises: adsorbing urokinase from an aqueous solution containing at least 500 CTA units of urokinase per milliter of solution at a pH in the approximate range 5.0 to 6.5 onto carboxymethylcellulose; and collecting the carboxymethylcellulose with urokinase adsorbed thereon and eluting urokinase therefrom with a sodium phosphate buffer at a pH in the approximate range 6.0–7.0 wherein the molar concentration of sodium phosphate is at least 0.25.

17. The method for the purification of urokinase which comprises: contacting a pyrogen-containing aqueous urokinase solution with calcium phosphate gel having 6,9-diamino-2-ethoxyacridine adsorbed thereon, whereby the urokinase and a major proportion of the pyrogens are adsorbed onto the gel; collecting the gel with urokinase, pyrogens, and 6,9-diamino-2-ethoxyacridine adsorbed thereon and eluting it with a sodium phosphate buffer at a pH in the approximate range 6.0 to 7.0 wherein the molar concentration of sodium phosphate is at least 0.25, whereby the urokinase and a small proportion of the 6,9-diamino-2-ethoxyacridine are eluted from the gel into the phosphate buffer; adsorbing the remainder of the 6,9-diamino-2-ethoxyacridine from the urokinase-containing eluate onto carboxymethylcellulose; separating the carboxymethylcellulose with 6,9-diamino-2-ethoxyacridine adsorbed thereon from the urokinase-containing solution; adjusting the molar concentration of sodium phosphate in the urokinase-containing solution to a value no greater than 0.15, and adsorbing the urokinase from the resulting solution at a pH in the approximate range 5.0 to 6.5 onto carboxymethylcellulose; and eluting the urokinase from the carboxymethylcellulose, whereby a substantially pyrogen-free urokinase-containing solution is obtained.

18. The method for the purification of urokinase which comprises: contacting a pyrogen-containing aqueous urokinase solution at a pH in the approximate range 6.0–7.0 with calcium phosphate gel having 6,9-diamino-2-ethoxyacridine adsorbed thereon, whereby the urokinase and a major proportion of the pyrogens are adsorbed onto the gel; collecting the gel with urokinase, pyrogens, and 6,9-diamino-2-ethoxyacridine adsorbed thereon and eluting it with a sodium phosphate buffer at a pH in the approximate range 6.0–7.0 wherein the molar concentration of sodium phosphate is at least 0.25, whereby the urokinase and a small proportion of the 6,9-diamino-2-ethoxyacridine are eluted from the gel into the phosphate buffer; adsorbing the remainder of the 6,9-diamino-2-ethoxyacridine from the urokinase-containing eluate onto carboxymethylcellulose; separating the carboxymethylcellulose with 6,9-diamino-2-ethoxyacridine adsorbed thereon from the urokinase-containing solution; adjusting the molar concentration of sodium phosphate in the urokinase-containing solution to a value no greater than 0.15, and adsorbing the urokinase from the resulting solution at a pH in the approximate range 5.0 to 6.5 onto carboxymethylcellulose; and eluting the urokinase from the carboxymethylcellulose with a sodium phosphate buffer at a pH in the approximate range 6.0 to 7.0 in which the molar concentration of sodium phosphate is at least 0.25, whereby a substantially pyrogen-free urokinase-containing eluate is obtained.

19. The process for obtaining human urokinase in crystalline form which comprises: dissolving a urokinase preparation having a urokinase activity of at least 40,000 CTA units per mg. of protein with sodium phosphate buffer at a pH in the approximate range 6 to 7 to produce a solution having a urokinase activity of at least 100,000 CTA units per ml.; dialyzing the resulting solution at a temperature in the approximate range 0° C. to 4° C. against water until the specific resistance increases to at least 2500 ohms; removing and discarding the precipitate which forms; salting the urokinase out of solution by treatment with sodium chloride; collecting the thus-precipitated urokinase and dissolving it in aqueous sodium chloride solution; and salting the urokinase out of solution with sodium chloride, whereby the urokinase is obtained in crystalline form.

20. Human urokinase in substantially homogeneous form, having a molecular weight of approximately 54,000 and having a specific urokinase activity of approximately 652,000 CTA units per milligram of nitrogen and approximately 104,000 CTA units per mg, of estimated protein, and being substantially free of pyrogens and thromboplastic substances.

21. An injectable preparation of human urokinase for dissolution of blood clots in humans which consists essentially of an aqueous solution of human urokinase as defined in claim 20.

References Cited

UNITED STATES PATENTS 3,281,331  10/1966  Bergkvist _____ 195—66

OTHER REFERENCES

Bergstrom, Arckiv for Kemi 21 (48), 535–545, 1963.
Dixon et al., Enzymes, 2nd ed., 1964, pp. 44–46.
Sherry et al., Journal of Laboratory and Clinical Medicine 64 (145–153), July 1964.
Sgouris et al., Vox Sanguinis 7, 1962.

A. LOUIS MONACELL, *Primary Examiner.*

L. M. SHAPIRO, *Assistant Examiner.*